United States Patent [19]

Normandin

[11] 4,025,246

[45] May 24, 1977

[54] ROTARY MACHINE WITH COUNTER-WEIGHTS FOR INTERFITTED VANES

[76] Inventor: Michel Normandin, 1328 Nelles Ave., Ste-Foy, Quebec, Canada

[22] Filed: June 20, 1975

[21] Appl. No.: 588,890

Related U.S. Application Data

[63] Continuation-in-part of Ser. No. 496,809, Aug. 12, 1974, Pat. No. 3,964,447, and a continuation-in-part of Ser. No. 498,215, Aug. 16, 1974, Pat. No. 3,954,358.

[52] U.S. Cl. .................. 418/151; 418/255; 418/261; 188/290; 60/468; 60/485; 60/494
[51] Int. Cl.² .................. F01C 1/00; F16D 57/00; F16D 31/06; F01C 21/00
[58] Field of Search .......... 418/151, 255, 261, 264; 60/468, 485, 494; 188/290

[56] References Cited

UNITED STATES PATENTS

| | | | |
|---|---|---|---|
| 1,126,812 | 2/1915 | McQueen | 60/485 |
| 1,150,478 | 8/1915 | Zagora | 60/485 |
| 1,354,777 | 10/1920 | Rock | 60/494 |
| 1,617,366 | 2/1927 | Beard et al. | 188/290 |
| 1,619,429 | 3/1927 | Maillefer | 418/151 |
| 1,871,525 | 8/1932 | Hudson | 418/255 |
| 2,016,040 | 10/1935 | Kennedy | 60/468 |
| 2,314,056 | 3/1943 | Sobek | 418/151 |
| 3,954,358 | 5/1976 | Normandin | 418/151 |

FOREIGN PATENTS OR APPLICATIONS

| | | | |
|---|---|---|---|
| 836,423 | 10/1938 | France | 418/151 |
| 413,824 | 5/1946 | Italy | 418/151 |

*Primary Examiner*—John J. Vrablik
*Attorney, Agent, or Firm*—Cushman, Darby & Cushman

[57] ABSTRACT

The rotary machine comprises: a stationary housing having an interior profile defining a monolobic configuration; a rotary cylindrical body arranged eccentrically in the housing and including a series of arc-shaped segments mounted in circular alignment in the housing and spaced to define therebetween a series of radial slots; interfitted double vanes slidably received in the slots; and counterweight means mounted in the body and disposed adjacent each blade portion of the double vanes; during rotation of the body, the counterweight means at one end of one double vane gradually opposes the movement of the said one double vane while, simultaneously, at the opposite end of the same double vane, the counterweight means are gradually removed from this opposite end of the blade portion whereby the centrifugal forces acting on the double vanes are balanced and vane pressure on the housing is minimized. The disclosure also describes the rotary machine incorporated in a motor, pump, transmission, differential and brake.

21 Claims, 26 Drawing Figures

ROTARY MACHINE WITH COUNTERWEIGHTS FOR INTERFITTED VANES

CROSS-REFERENCE TO RELATED APPLICATIONS

This new application is a continuation-in-part of Ser. No. 496,809 filed Aug. 12, 1974 U.S. Pat. No. 3,964,447 and of Ser. No. 498,215 filed Aug. 16, 1974, U.S. Pat. No. 3,954,358.

FIELD OF THE INVENTION

The present invention relates to rotary machines and, more particularly, this invention relates to vane-type rotary fluid displacing machines, such as pumps, motors, transmissions, differentials, brakes or the like.

BACKGROUND OF THE INVENTION

Vane-type rotary machines are known and consist of a rotary body, arranged eccentrically in a stationary housing. Vanes are radially slidable in slots provided in the body and counterweights are used to act on the vanes to reduce the centrifugal forces arising when the rotary body is in operation. The vanes must always remain in contact with the interior profile of the housing in order to prevent any fluid circulation or heavy leakage between moving chambers defined by the vanes, the inner profile of the housing and the outer profile of the rotary body. To meet this objective, it is essential that vane pressure be always positive by a non-negligeable amount in order to prevent any lifting of the vanes from the housing, which lifting may be either produced by external causes or by the reversal of centrifugal positive force produced by the acceleration induced by the radial displacement of the system vane-counterweights.

One way to insure that there will be no lifting of the vanes from the inner profile of the housing and no significant leakage between the chambers and that the vane pressure on the housing will remain fairly small is by the adoption of:

a. a double vane system;
b. a housing configuration of an odd order with constant diametrical chord; and
c. a symmetrical system of counterweights that will take into account, not only the centrifugal action of the double mass system, but also the very important acceleration produced by the movement of the vane system in a non-circular housing.

With respect to housing configuration, it is considered, however, that a third, or higher, order configuration will not provide satisfactory results due to the very high component of the acceleration produced by the radial displacement of the vanes.

Some systems are known which rely on the centrifugal action of simple vanes. However, it is known that such known constructions do not take into account the acceleration produced by the radial displacement of the vane-counterweight system. It is to be remembered that, contrary to the centrifugal acceleration, the radial acceleration produced by the radial displacement acts on the total mass of the system and not only on the mass of the blade or of the counterweights. Furthermore, these known constructions do not take into account the lifting of the vane in a certain portion of its cyclic movement thereby resulting in corresponding circulation or heavy leakage between chambers. Furthermore, these systems do not take into account the vibratory motion produced by the vane lifting followed by the subsequent knocking of the same vane on the housing in another portion of the cycle.

In fact, instead of reducing vane pressure on the housing, some of the known systems, which are based only on balancing the centrifugal action, actually increase the vane-system pressure in a decreasing radius section of the housing where a corresponding negative value of the radial displacement is achieved.

OBJECTS OF THE INVENTION

It is an object of this invention to provide a rotary machine of the vane type wherein the vane pressure on the housing is minimized and wherein the centrifugal forces acting on the system are effectively balanced. This is achieved by utilizing a double action vane system rotating in a first-order housing configuration with constant diametrical chord and equipped with a counterweight system which takes into account the acceleration produced by the radial displacement.

When the rotor is turning within a non-circular housing, the double vanes are moving alternately by following the housing, one blade portion of the double vanes moving toward the axis of rotation and the opposite blade portion moving away therefrom. A system of counterweights are provided adjacent each opposite blade portion of each double vane whereby one blade portion is successively picking up counterweights in its inward radial movement while the opposite blade portion is successively releasing counterweights. By suitably selecting counterweights in accordance with the weight and geometry of the double vanes and of the housing profile, the bearing pressure of the double vanes on the housing is almost nil.

STATEMENT OF THE INVENTION

The present invention, therefore, relates to a rotary machine comprising, in combination:
a. a stationary housing having an interior profile defining a monolobic configuration;
b. a rotary cylindrical body having an axis of rotation arranged eccentrically in this housing, the body including a series of arc-shaped segments mounted in circular alignment in the housing and being equally spaced from one another to define therebetween a series of diametrically opposite slots;
c. interfitted double vanes slidably received in the slots, each double vane being longer than the diameter of the body and including diametrically opposite blade portions, these double vanes being diametrically shiftable in the slots during rotation of the body; and
d. counterweight means mounted in the body and disposed adjacent each blade portion;

the counterweight means adjacent one blade portion of one double vane gradually opposing the movement of this blade portion toward the axis of rotation while the counterweight means on the opposite blade portion of this double vane gradually remove the centrifugal effect thereof of the said opposite blade portion whereby, as the cylindrical body rotates, the centrifugal forces on the double vanes are balanced and vane pressure on the housing is minimized.

One advantage of such rotary machine is that it is possible to use it in a number of different applications, such as in a pump, motor, transmission, differential or brake.

Other objects and further scope of applicability of the present invention will become apparent from the detailed description given hereinafter; it should be understood, however, that the detailed description while indicating preferred embodiments of the invention is given by way of illustration only, since various changes and modifications within the spirit and scope of the invention will become apparent to those skilled in the art from the detailed description.

DESCRIPTION OF BASIC CONSTRUCTION OF ROTARY MACHINE

Referring to FIGS. 1–8 of the drawings, the basic construction of a rotary machine made in accordance with the present invention is illustrated. The rotary machine, generally denoted as 10, comprises a stationary housing 12 and a rotary cylindrical body 14 arranged eccentrically in the housing.

Figures 1, 2:
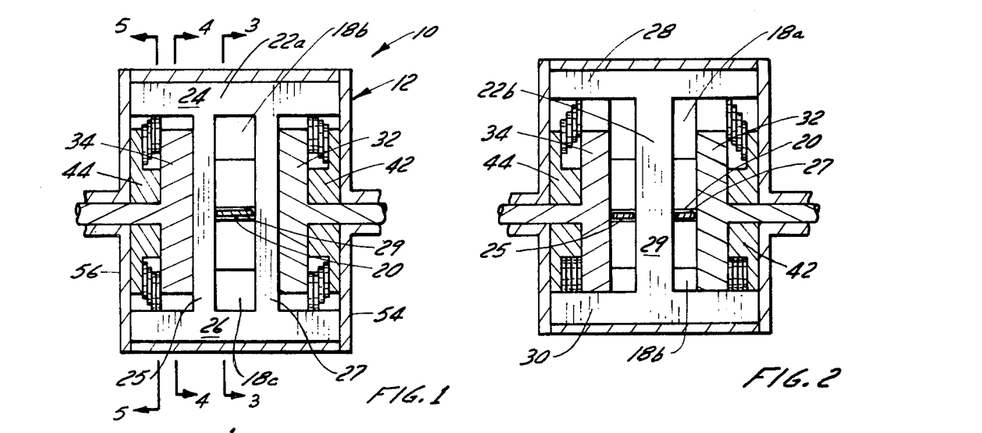
FIG. 1 is an elevation cross-sectional view taken through a rotary machine made in accordance with the present invention.
FIG. 2 is a cross-sectional view taken along lines 2—2 of FIG. 3.
Figure 3:
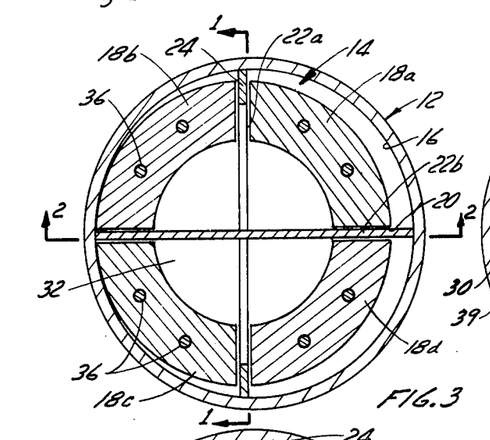
FIG. 3 is a cross-sectional view taken along lines 3—3 of FIG. 1.

The housing has an interior profile 16 which is non-circular and monolobic, i.e. a first order configuration with constant diametrical chord.

Figure 6:
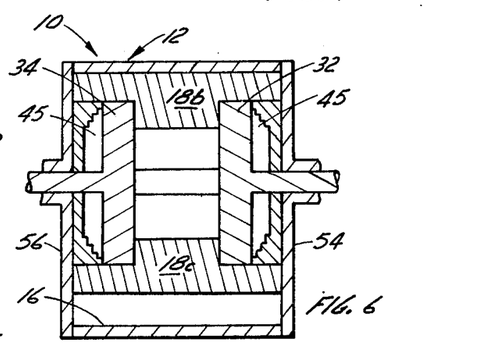
FIG. 6 is an elevation cross-sectional view of the rotary machine without the presence of the double vanes and of the counterweight means.

The rotary cylindrical body 14 includes a series of arc-shaped segments 18 mounted in circular alignment in the housing. In the embodiment illustrated, there are four segments shown as 18a, 18b, 18c and 18d; these segments are truncated as illustrated in FIG. 6. The segments 18 are spaced from one another to define therebetween a series of radial slots 20. The number of segments is always even so as to have pairs of radial slots in diametrically opposite arrangement.

Figure 4:
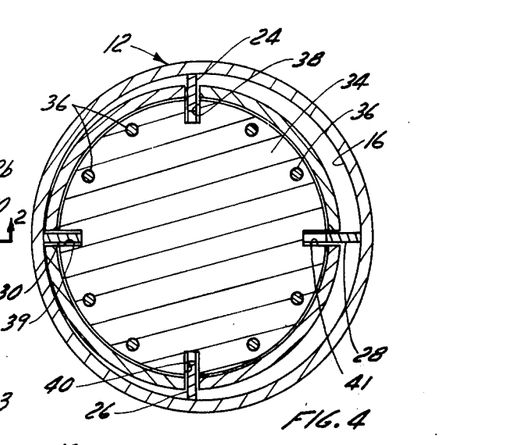
FIG. 4 is a cross-sectional view taken along lines 4—4 of FIG. 1.
Figure 5:
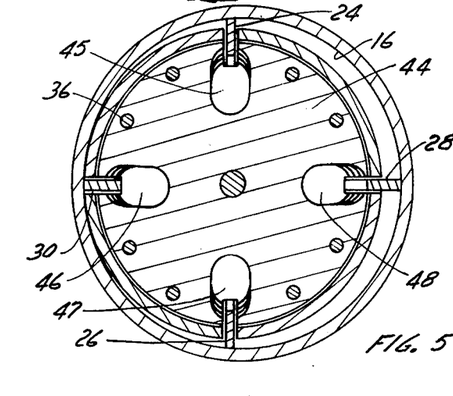
FIG. 5 is a cross-sectional view taken along lines 5—5 of FIG. 1.

A set of interfitted double vanes, generally denoted as 22, are slidably mounted in these slots 20. Since there are four arc-shaped segments 18 in the embodiment illustrated in FIGS. 1–8, there are two double vanes 22a, 22b. Each blade is made from a single plate of metal that includes two diametrically opposite blade portions interconnected by a tie element; referring to FIGS. 1–3, double vane 22a includes blade portions 24, 26 and tie element 25 while double vane 22b includes blade portions 28, 30 and tie element 27. As can be seen in FIGS. 1 and 2, ties 25, 27 are arranged in the central portion of the cylindrical body in such a way as to prevent any interference between them when the cylindrical body is rotating. In the embodiment illustrated, the arc-shaped segments 18 are attached to a pair of flanged shafts 32 and 34 by appropriate securing means, such as bolts 36. Referring to FIG. 4, these flanged shafts are provided with a series of slots 38, 39, 40 and 41 to receive the corresponding extremities of blade portions 24, 30, 26 and 28, respectively.

Figure 7:
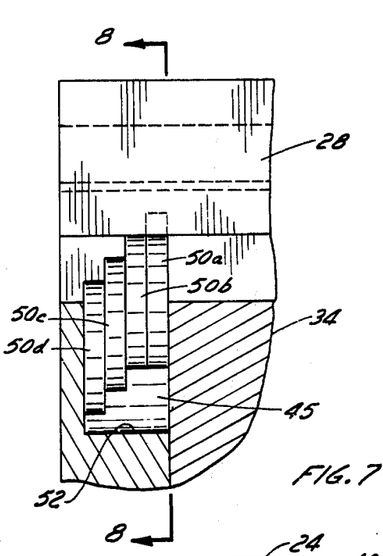
FIG. 7 is an enlarged view of the counterweight arrangement in the rotary machine.
Figure 8:
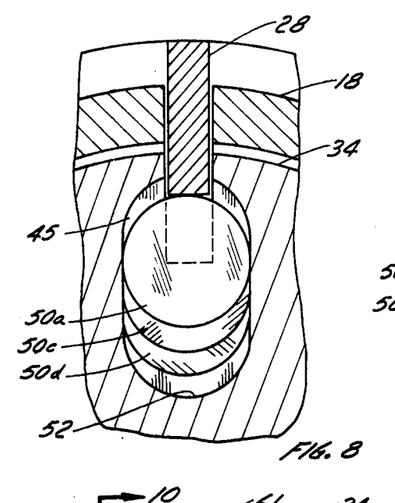
FIG. 8 is a cross-sectional view taken along lines 8—8 of FIG. 7.

Two rings 42 and 44 are secured to the flange portions of members 32 and 34 and include a set of step cavities 45, 46, 47, 48 in which are housed counterweight means, which may be in the form of a disc 50 as illustrated in FIG. 7. Each of these cavities is provided with a radial slot (see FIG. 1a) opening to the periphery of the ring to allow the alternative displacement of the double vane when in rotation. Securing means, such as bolts 36, fasten the rings to their associated flanged shaft. Referring to FIGS. 7 and 8, cavity 45 is dimensioned and shaped so as to allow a radial displacement of different value for each counterweight disc 50a, 50b, 50c and 50d. The inner face 52 of cavity 45 is parallel to the axis of rotation while the outer face is stepped to provide various radial positions for the discs. When the cylindrical body rotates in a non-circular housing, the double vanes are alternately shifting in their slots by following the housing profile. One blade portion of a double vane moves toward the center or axis of rotation of the cylindrical body while the diametrically opposite blade portion of the same vane moves away from this center. The said one blade portion successively picks up counterweight discs in its radial movement toward the axis while the said opposite blade portion successively releases counterweight discs picked up during the preceding inward movement. Therefore, FIGS. 7 and 8 may represent blade portion 28 either moving away or toward the center of the cylindrical body. Assuming that it is moving inwardly, it can be seen that blade 28 has picked up discs 50a and 50b. If the blade portion is moving radially outwardly, it can be seen that it is on the verge of leaving disc 50b against its corresponding stepped face of cavity 45.

The number of double vanes, defined by the characteristics of the system required, determines the number of segments and the number of sets of counterweight discs. Depending on the weight and geometry of the double vanes and on the housing profile, the counterweight discs are selected so the bearing pressure of the vanes on the housing is almost nil.

To prevent any blocking of the counterweights in their respective cavities, the diameter of the counterweight discs should be greater than the full course of the double vane in its radial slot.

Figure 9:
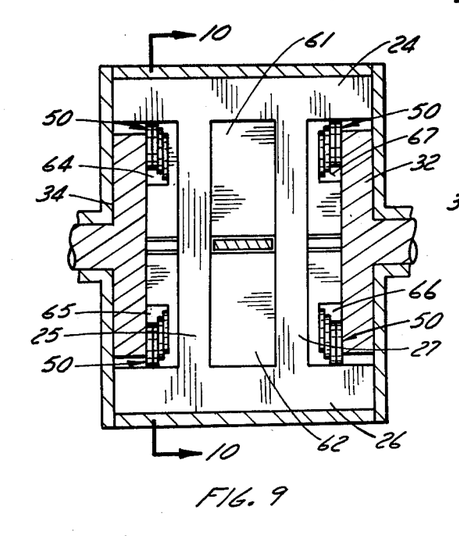
FIG. 9 is a cross-sectional view similar to FIG. 1 but showing another embodiment of the invention.
Figure 10:
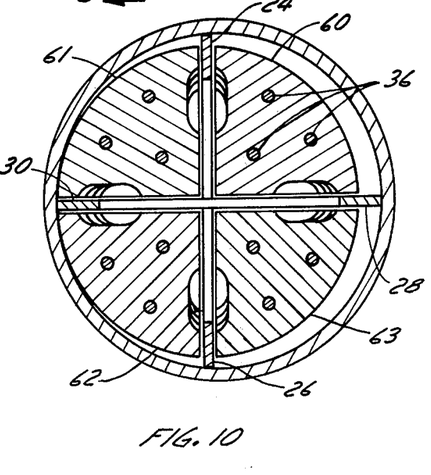
FIG. 10 is a cross-sectional view taken along lines 10—10 of FIG. 9.

FIGS. 9 and 10 illustrate a different arrangement for the counterweight means; in this embodiment, no circular rings are provided; however, the arc-shaped segments 60,61,62 and 63 extend from one flanged shaft to the other and include, at their opposite end, cavities 64,65 and 66,67 which are stepped, similar to rings 42,44 in FIG. 1, to receive the counterweight discs 50. In this embodiment, the segments are shown structured somewhat differently and are secured to the flanged shafts 32 and 34 by suitable fastening means, such as bolts 36.

Figure 11:
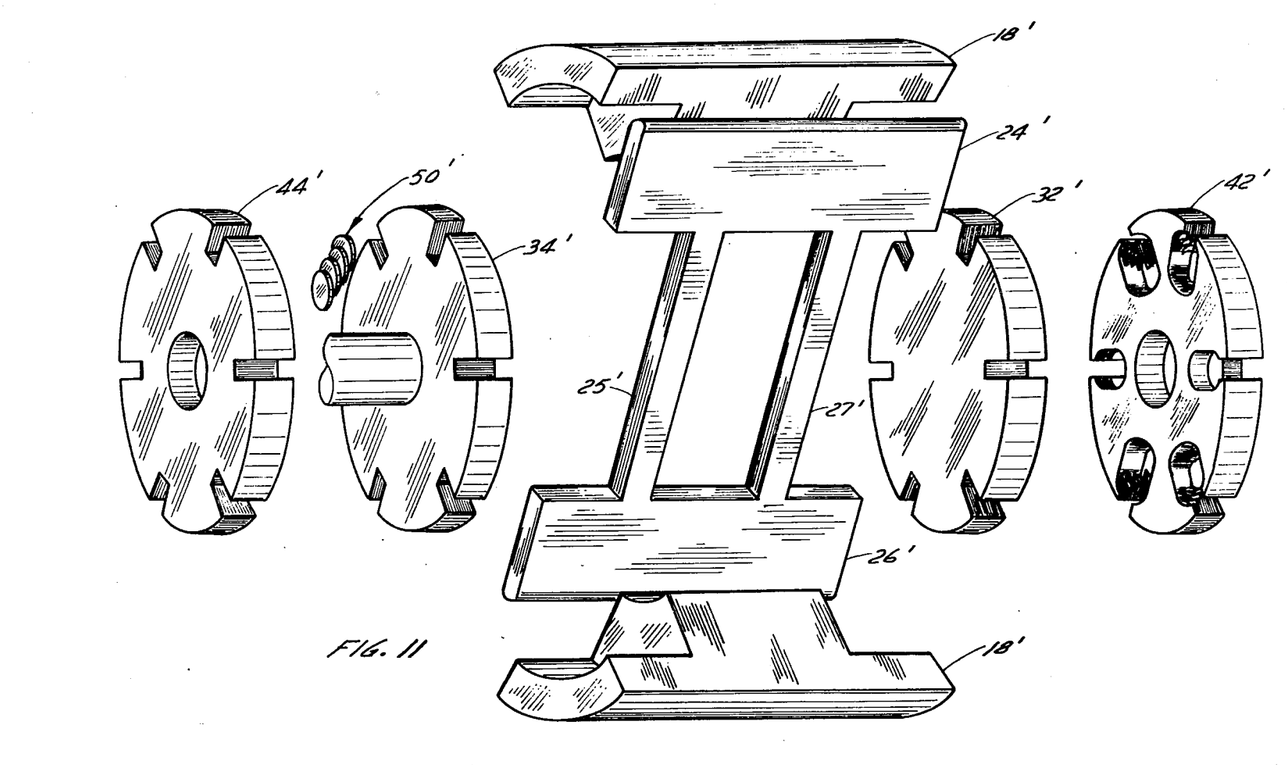
FIG. 11 is an exploded perspective view showing some of the important components of another embodiment of the present invention.

FIG. 11 shows some of the various parts constituting the present rotary machine; however, the segments in this embodiment define an arc of 60° rather than an arc of 90° as illustrated in FIGS. 1-10. The function of the various parts corresponds to that of similar parts of the embodiment illustrated in FIGS. 1-10 and they have been provided with similar reference characters only differing by the addition of a prime mark.

The advantages of a rotary machine made in accordance with the present invention are that it can be used in a number of applications, such as a hydraulic pump, a hydraulic motor, a hydraulic transmission, a hydraulic differential or a hydraulic brake.

ROTARY MACHINE AS A PUMP

Figure 12:
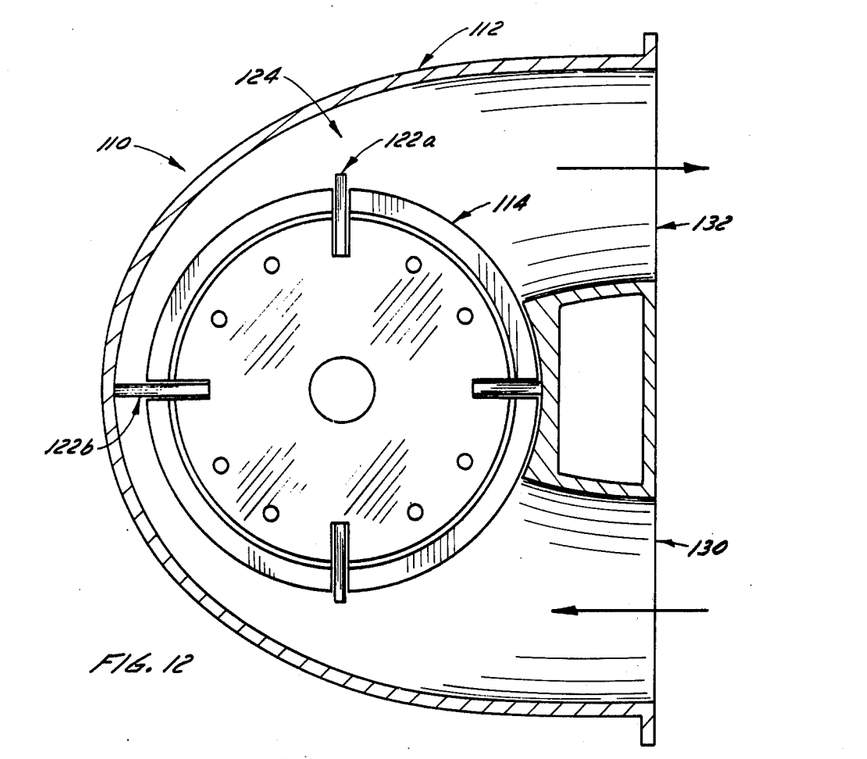
FIG. 12 is a cross-sectional view showing a rotary machine in accordance with the present invention used in a pump.
Figures 13, 14:
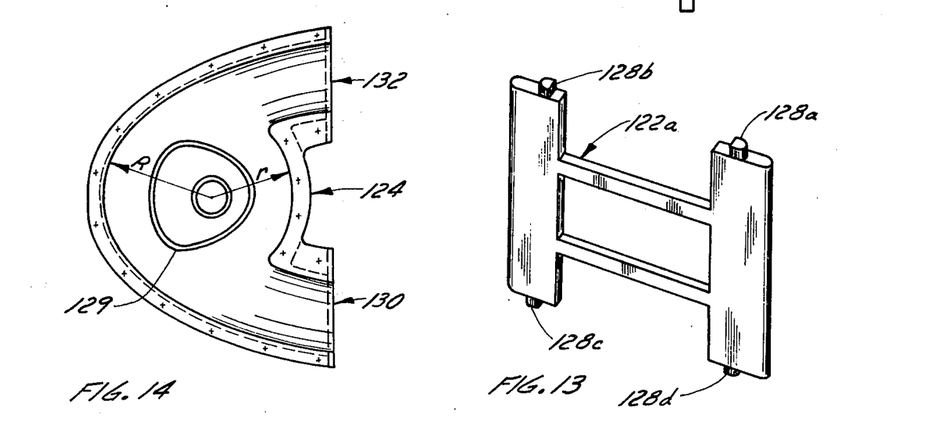
FIG. 13 is a perspective view of a double vane used in a pump such as shown in FIG. 11.
FIG. 14 is a side elevation view of an end plate used in a pump such as shown in FIG. 11.
Figure 15:
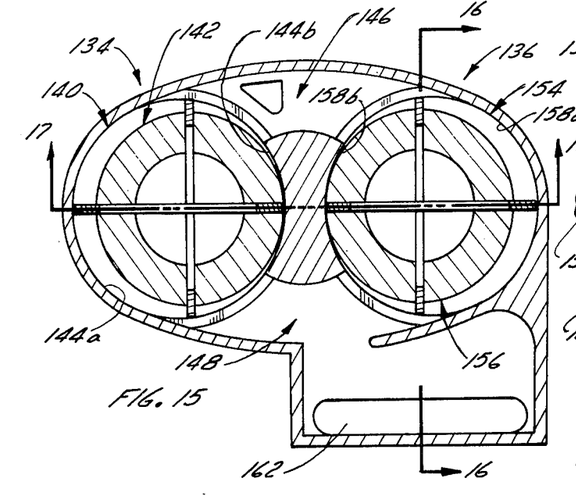
FIG. 15 is a cross-sectional view showing two rotary machines made in accordance with the present invention and adapted to be used in a transmission.
Figure 16:
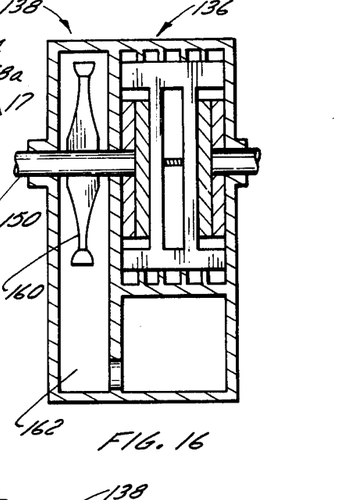
FIG. 16 is a cross-sectional view as seen from line 16—16 of FIG. 15.
Figure 17:
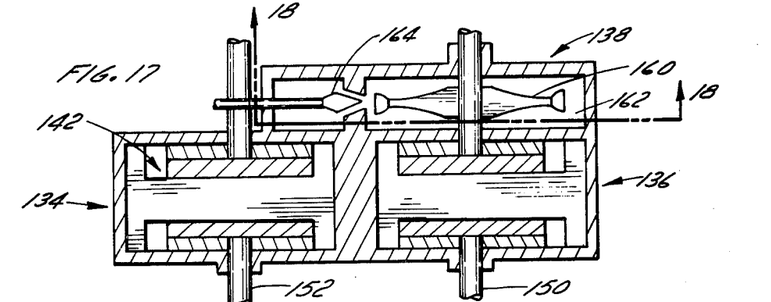
FIG. 17 is a cross-sectional view as seen from line 17—17 of FIG. 15.
Figure 18:
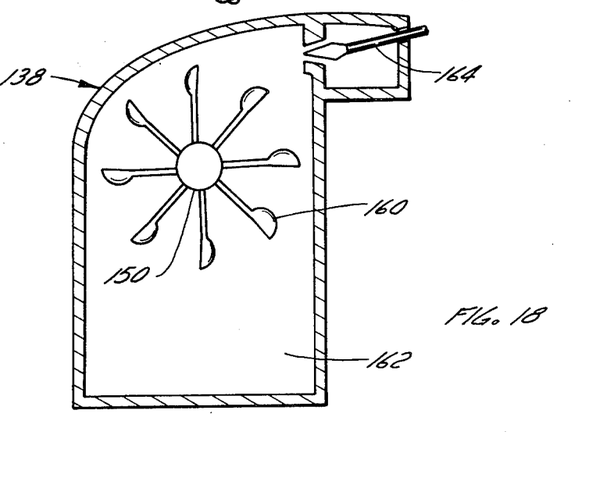
FIG. 18 is a cross-sectional view taken along line 18—18 of FIG. 17.

The above rotary machine is well suited to operate in a pump provided that suitable intake and exhaust means be provided either through the housing periphery or through one or both end plates thereof. One simple construction may consist in gradually flaring the housing profile to form smoothly profiled fluid intake and exhaust. Such a fluid pump 110 is illustrated in FIG. 12. The cylindrical body 114 may be structured identically to the cylindrical body 14 described above in FIGS. 1-8 or the one described in FIGS. 9-10. However, as shown in FIG. 13, the blade portions of the vanes 122a and 122b are each provided with tips 128a, 128b, 128c and 128d which will be received in corresponding guiding grooves provided in each end plate of the housing; one such groove 129 is shown in an end plate 124. The grooves follow a specific curve which is determined to assure an almost perfect balance of the double vanes acting with the counterweight means. Housing 112 is shown provided with a fluid intake or suction zone 130 and a fluid exhaust or pressure zone 132. The housing includes, in its configuration, a monolobic profile; in the embodiment illustrated in FIG. 14, it includes two constant radius arc of radii R and r; however, these radii need not be constant. The angle of these two arcs depends on the number of double vanes used.

The fluid flow in the pump is directly proportional to the rotor velocity, the width of the pump, the height of the chamber in the constant radius portion of the flow and the mean radius of the chamber in the same area.

The pressure is defined by the exhaust pressure of the fluid and the power required to reach this pressure is an almost linear function of this pressure taking into account the geometric parameters of the pump.

The vane pressure acting directly on the housing or on the guiding grooves provided in the two end plates is small due to the balancing characteristics of the double vane and the added effect on the counterweights.

The fairly small hydraulic losses through this pump is a function of the fluid velocities and the mechanical losses due to the radial movement of the double vanes and the very low friction on these vanes on the housing and on the radial openings of the cylindrical body is at least two orders of magnitude less than the power required to drive the pump.

Because of an almost unobstructed flow that produces low hydraulic losses for reasonable velocites and because of the low mechanical losses by an almost perfectly balanced rotor, the total efficiency of the pump can be quite high compared to the efficiency of standard vane pumps.

The vane-type rotary hydraulic pump proposed is a rugged, simple, versatile, noiseless, vibrationless, quite inexpensive pump that can meet most of the needs of pump users of all categories.

The components used in the construction of this pump are very simple and do not require a very complicated production procedures from the point of view of the manufacturer. From the user point of view, maintenance is quite simple and all the components can be produced in a small machine shop.

ROTARY MACHINE AS A MOTOR

The vane-type rotary hydraulic pump that has been described above may operate as a vane-type rotary hydraulic motor if the pump is made completely reversible. The characteristics of the two systems are exactly the same and, if the exhaust line of the pump is not provided with a check valve (or the intake line with a foot valve), the pump will reverse itself under the exhaust pressure and will reach runaway speeds acting as a motor.

The hydraulic pump (or hydraulic motor) described above may be used as a hydraulic meter if its shaft is linked to a suitable counter.

ROTARY MACHINE AS A TRANSMISSION

A fluid drive or hydraulic transmission is obtained if two identical housing systems made in accordance with the present invention are joined together; this may be obtained if the exhaust and intake of a pump, such as the one described above with reference to FIGS. 12-14, are directly and respectively connected to the intake and exhaust of an hydraulic motor (also described above). A suitable controlled by-pass (with variable head losses) is inserted between the pump housing and the motor housing or added after the two housings. With the by-pass fully opened, the system is idling, i.e. the motor unit is not turning; when the by-pass is gradually closed, the motor begins to turn with increasing velocity until it reaches the pump velocity, the by-pass being fully closed. This by-pass may be a simple pressure-reducing device or an energy-recuperating sub-system directly coupled to the output axle. This subsystem may be in the general form of a turbine wheel which will recuperate a significant portion of the energy of the by-pass fluid. One example of such a transmission is illustrated in FIGS. 15–18.

Referring to these drawings, the vane-type rotary hydraulic transmission includes a pump portion 134, a motor portion 136 and an energy-recuperating by-pass 138.

The hydraulic pump portion 134 includes an outer stationary housing 140, or stator, and a central rotary body 142, or rotor. The housing has an interior profile 144 which incorporates arc sections 144a and 144b. The housing end plates include guiding grooves (not shown) for guiding the double vanes along their above-described course. The detailed structure of the pump and motor will not be repeated since it has been defined above when describing the construction of the rotary machine and of the pump. The housing profile is gradually flared from the extremities of both arc sections to form intake zone 146 and exhaust zone 148.

The motor portion of the transmission is made in a shape similar to the pump geometrical configuration. However, there are two functional differences: first, the motor torque is transmitted from the rotor 142 to the axle 150 whereas the pump torque is transmitted from the axle 152 to the rotor 142. Secondly, the motor high pressure zone is at zone 146 whereas the pump high pressure zone is at zone 148.

The hydraulic motor includes an outer stationary housing 154, or stator, and a central rotary body 156, or rotor. The housing has an interior profile 158 which incorporates two constant-radius arcs 158a and 158b. The two end plates of the transmission housing further include guiding grooves (not shown) for guiding the double vanes of the motor along their prescribed course. The housing profile of the motor housing is correspondingly flared from the extremities of both constant-radius arcs to form the above described intake and exhaust zones 146 and 148. Again, the rotary body of the motor will not be described since it is constructed in accordance with the invention described above with reference to the embodiment illustrated in FIGS. 1–8 or the one illustrated in FIGS. 9 and 10.

The by-pass may be in the form of a conduit joining together, at the center of the hydraulic transmission, the exhaust of the pump (or intake of the motor) to the intake of the pump (or exhaust of the motor). This conduit may be provided with suitable pressure-reducing means, such as a valve, to reduce the flow and increase the pressure differential between the exhaust and the intake until the by-pass flow is completely cut off. (see FIG. 25, described below).

In the embodiment of FIGS. 15–18, the energy-recuperating by-pass is in the general form of a turbine wheel 160, such as a Pelton wheel, mounted in housing 138 on the motor axle 150 and operating under the action of a flow controlling means, such as a control nozzle 164, that will gradually vary the fluid velocity while the rotational velocity of the motor is gradually increased until it reaches a velocity geometrically corresponding to the velocity of the pump when the flow-controlling device is completely shut-off. Other flow controlling means may be used such as those shown in FIGS. 24 and 25 described hereinbelow.

Hence, there is provided a vane-type rotary hydraulic transmission which requires small power to move the partially unbalanced double vanes even at high rotational velocities, and where the heat losses due to the centrifugal action of the vanes on the housing and on the guiding grooves are considerably reduced.

ROTARY MACHINE AS A DIFFERENTIAL

If, in the transmission described above, the pump rotor is made wider and a second motor rotor is added with a wall separating the two motor rotors, a differential is obtained. The pump rotor is made wider than a standard pump rotor because it feeds two standard motor rotors.

Figure 19:
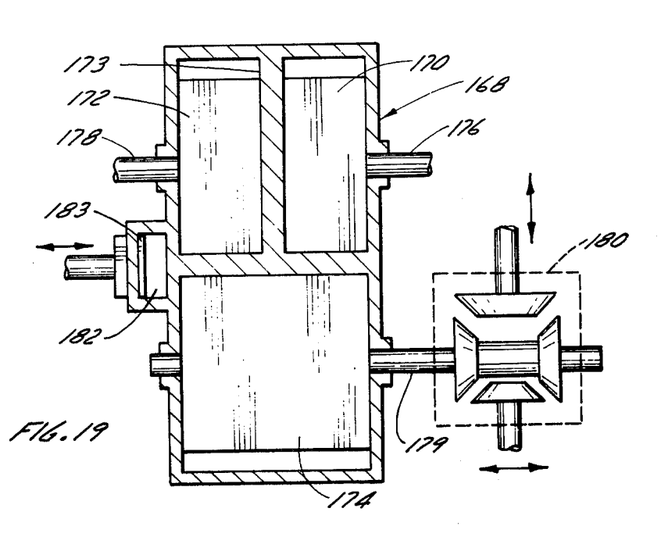
FIG. 19 is a cross-sectional view showing three rotary machines constructed in accordance with the present invention and used in a differential and transmission assembly.
Figure 20:
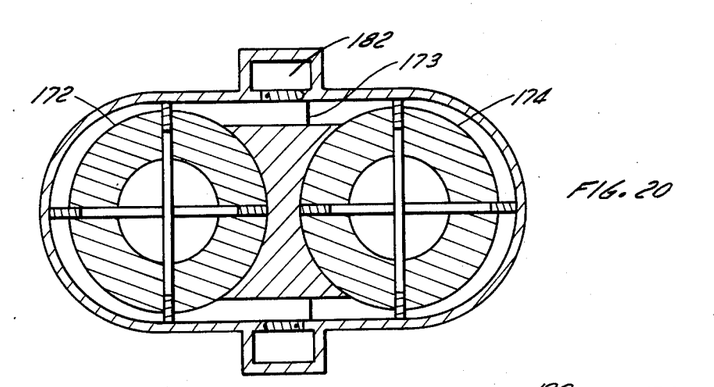
FIG. 20 is a longitudinal cross-sectional view of the assembly of FIG. 19.

FIGS. 19–23 show various arrangements of a differential and of a differential-transmission assembly. For example, FIG. 19 shows a differential 168 which includes two adjacent motor rotors 170 and 172 and one pump rotor 174. The rotory bodies 170 and 172 are respectively provided with axles 176 and 178, which may be connected, for example, to the right and left wheels of a vehicle. The construction of the housing and of the rotary body for each motor and pump is basically the same as for the rotary machine described above with respect to FIGS. 1–8 or 9–10, except for a separating wall 173 between the two motor housings. The axle 179 of the pump rotor is operatively linked to the engine of a vehicle through a gear box system 180. Due to probable difficulties in the construction of a double vane system for a wide pump rotor, the latter could be split into two rotors with interlocks provided between the two rotors and between the two sets of double vanes.

Figure 21:
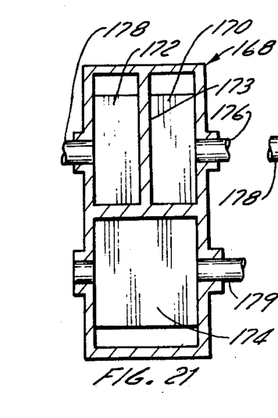
FIG. 21 is a cross-section view showing a differential using rotary machines made in accordance with the present invention.

A simple differential is shown in FIG. 21.

With the present invention, it is possible to combine a transmission and a differential into a single assembly for use in a vehicle. Depending on the driving function required, the transmission and differential assembly will operate direct or reverse. For this reason, the differential shown in FIGS. 19 and 20 includes a by-pass 182 equipped with a fluid controlling device, such as a valve 183.

Figure 22:
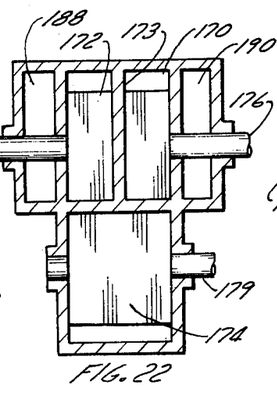
FIGS. 22–23 show other differential and transmission assemblies with energy recuperating by-pass arrangements.
Figure 23:
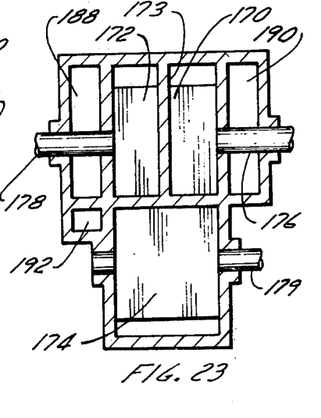

FIGS. 22 and 23 show some of the possible arrangements of by-passes for a differential transmission assembly. For example, FIG. 22 shows the differential with two energy-recuperating by-passes 180 and 190 which may be used for direct drive only. FIG. 23, on the other hand, shows the differential with two energy-recuperating by-passes 180 and 190 and with the addition of a simple flow controlling by-pass 192, wherein the direct drive is effected with two energy recuperating by-passes 180 and 190 while the reverse drive is obtained with the aid of a controlled by-pass 192.

Figure 24:
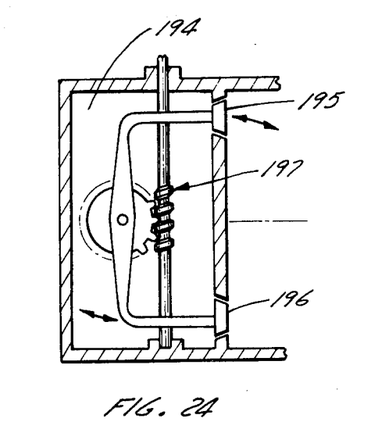
FIGS. 24 and 25 show two examples of flow controlling by-passes.
Figure 25:
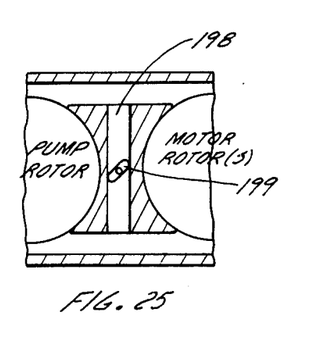

Some reversible simple by-passes are shown in FIGS. 24 and 25.

FIG. 24 shows a simple flow controlling by-pass 194 with gates 195 and 196 in closed position. These gates may be operated through a mechanism 197 which may be controlled by an electric motor (not shown). This gate control mechanism may be inside or outside the by-pass chamber. The gate system may be easily closed since it does not compress fluid in the by-pass chamber.

FIG. 25 shows a simple by-pass passageway 198 in which there is a reversible valve 199.

ROTARY MACHINE AS A BRAKE

If an hydraulic motor as described above is arranged in such a way that the exhaust or outlet smoothly closes on the intake or inlet and a suitable flow controlling device is added in the by-pass thus formed, a simple hydraulic brake is provided which does not require any brake lining and that may be operated very smoothly.

Figure 26:
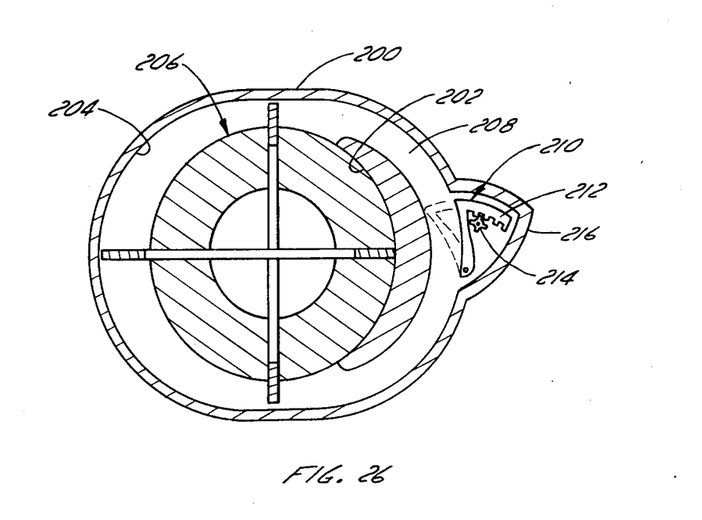
FIG. 26 shows a cross-sectional view of a rotary machine made in accordance with the present invention and used in a brake mechanism.

FIG. 26 shows one embodiment of a brake made in accordance with the present invention and includes a housing 200 which has an interior profile that includes a portion 204 defining with a crescent 202 a monolobic configuration. A rotary cylindrical body 206 is received within this housing configuration and is structured with arc-shaped segments, interfitted double vanes and counterweights as described above. The housing further includes a fluid passageway 208 outside the housing configuration and a fluid flow controlling device 210 is mounted in this fluid passageway to gradually vary the flow of the fluid therein. In the embodiment illustrated, this flow controlling device consists of a rack and pinion arrangement 212-214 wherein the rack 212 serves as a gate which, when recessed in portion 216 of the housing, allows free flow of the fluid whereas no flow is allowed when the gate closes passageway 208. The axle to be brought to a stop is operatively mounted to the rotary body 206.

As in the case of a pump, motor, transmission and differential described above, guiding grooves are provided on the end plates of the brake housing to define a specific curve corresponding to the predetermined course which the double vanes of the rotary body must follow.

One of the drawbacks of hydraulic brakes is that they continuously dissipate energy in the form of heat produced by the low mechanical losses or by the hydraulic losses generated by the rather rapid movement of the fluid. However, by using optimum brake housing configuration, this energy loss may be kept at a low level provided that the rotational speed remains within reasonable limits. The present brake mechanism is not power-assisted, thus a corresponding saving in capital cost and in energy losses is obtained. It is evident that compressed air will work perfectly with the brake of the present invention and compressed air as a braking fluid will reduce frictional losses.

What I claim is:

1. A rotary machine comprising, in combination,
   a stationary housing having an interior profile defining a monolobic configuration,
   a rotary cylindrical body having an axis of rotation arranged eccentrically in said housing, said body including a series of arc-shaped segments mounted in circular alignment in said housing and being equally shaped from one another to define therebetween a series of diametrically opposite slots,
   a symmetrical system of vanes received in said slots, and bearing at each extremity against said interior profile, said vanes being longer than the diameter of said body and being shiftable in said slots during rotation of said body, each of said vanes including a pair of blades disposed at 180° with respect to each other and interconnected with ties, said ties being shaped to interfit each other to thereby prevent interfering with each other when said vanes slide in said slots,
   counterweight means mounted at opposite ends of said rotary body associated with each blade of each individual vane and in line therewith for balancing the effects of the centrifugal and inertial forces acting on said vanes, and minimzing the vane pressure on said housing interior profile,
   said counterweight means including a series of radially displaceable discs received in cavities provided in said cylindrical body, and stepped faces in said cavities for selectively limiting the radial displacement of each said disc in said cavities.

2. A rotary machine as defined in claim 1, wherein said cavities are provided in said arc-shaped segments.

3. A rotary machine as defined in claim 1, wherein the diameter of each said disc is greater than the full course of said blade portion when displaced in said slot.

4. A rotary machine as defined in claim 1, wherein said cylindrical body includes a pair of flanged shafts, the flanged portion of each said shaft being fixedly secured to said arc-shaped segments.

5. A rotary machine as defined in claim 4, wherein said cavities are provided in a pair of circular discs fixedly secured to corresponding flanged portions of said flanged shafts.

6. In a pump,
   a stationary housing having a fluid inlet section and a fluid outlet section, said housing having an interior profile defining, between said sections, a monolobic configuration,
   a rotary cylindrical body mounted within said interior profile and having an axis of rotation arranged eccentrically therein, said body including a series of arc-shaped segments mounted in circular alignment in said housing and being equally spaced from one another to define therebetween a series of diametrically opposite slots,
   a symmetrical system of vanes received in said slots and bearing at each extremity against said interior profile, said vanes being longer than the diameter of said body and being shiftable in said slots during rotation of said body, each of said vanes including a pair of blades disposed at 180° with respect to each other and interconnected with ties, said ties being shaped to interfit each other to thereby prevent interfering with each other when said vanes slide in said slots,
   counterweight means mounted at opposite ends of said rotary body associated with each blade of each individual vane and in line therewith for balancing the effect of the centrifugal and inertial forces acting on said vanes, and minimizing the vane pressure on said housing interior profile, and
   means for guiding said vanes through a predetermined course, said means including two opposite end plates of said stationary housing; a continuous groove being provided in each said end plate and defining a specific curve corresponding to said predetermined course and each vane blade portion having, at opposite edges thereof, guide means received in said grooves.

7. In a transmission,
   a stationary housing having an interior profile defining two monolobic configurations,
   a rotary cylindrical body mounted within each said monolobic housing configuration, each rotary cylindrical body having an axis of rotation arranged eccentrically in its associated housing configuration, each said body including a series of arc-shaped segments mounted in circular alignment in its associated housing configuration and being equally spaced from one another to define therebetween a series of diametrically opposite slots,
   a symmetrical system of vanes received in said slots of each of said bodies and bearing at each extremity against its respective interior profile, said vanes being longer than the diameter of the bodies with which they are associated and being shiftable in said slots during rotation of said bodies, each of said vanes including a pair of blades disposed at 180° with respect to each other and interconnected with ties, said ties being shaped to interfit each other to thereby prevent interfering with each other when said vanes slide in said slots, counterweight means mounted at opposite ends of each of said rotary bodies associated with each blade of each individual vane and in line therewith for balancing the effect of the centrifugal and inertial forces acting on said vanes, and minimizing the vane pressure on said housing interior profiles, fluid inlet and outlet ports for each of said bodies formed in said housing, the outlet port of one rotary body being associated with the inlet port of the other rotary body to define an intake zone, the inlet port of said one rotary body being associated with the outlet port of said other rotary body to define an exhaust zone, and a controlled by-pass connecting said exhaust and intake zones.

8. In a transmission as defined in claim 7, wherein said by-pass is provided with pressure-reducing means for controlling the flow of fluid between said exhaust and intake zones.

9. In a transmission as defined in claim 7, wherein said by-pass includes a turbine wheel mounted therein on the axis of one of said rotary bodies; said wheel being operable under the action of a flow controlling means.

10. In a transmission as defined in claim 7, wherein said housing includes means for guiding said vanes through a predetermined course.

11. In a transmission as defined in claim 10, wherein said stationary housing includes two opposite end plates; two continuous grooves being provided in each said end plate and defining a specific curve corresponding to said predetermined course; each said plate portion having, at opposite edge thereof, guide means received in said grooves.

12. In a differential,
a stationary body having two parallel motor housings and one pump housing, each said housing having an interior profile defining a monolobic configuration, both said motor housings being in fluid connection with said pump housing, said pump housing being wider than each of said motor housings, a rotary cylindrical body mounted within each said monolobic housing configuration, each rotary cylindrical body having an axis of rotation arranged eccentrically in its associated housing configuration, the rotary bodies of said two motor housing being coaxially connected, each said rotary body including a series of arc-shaped segments mounted in circular alignment in its associated housing configuration and being equally spaced from one another to define therebetween a series of diametrically opposite slots, a symmetrical system of vanes received in said slots of each of said bodies and bearing at each extremity against its respective interior profile, said vanes being longer than the diameter of the bodies with which they are associated and being shiftable in said slots during rotation of said bodies, each of said vanes including a pair of blades disposed at 180° with respect to each other and interconnected with ties, said ties being shaped to interfit each other to thereby prevent interfering with each other when said vanes slide in said slots, and counterweight means mounted at opposite ends of each of said rotary bodies associated with each blade of each individual vane and in line therewith for balancing the effects of the centrifugal and inertial forces acting on said vanes, and minimizing the vane pressure on said housing interior profiles.

13. In a differential as defined in claim 12, wherein each said housing include means for guiding said vanes through a predetermined course in each said housing.

14. In a differential as defined in claim 13, each said stationary body including two opposite end walls; two continuous grooves being provided in each said wall to define specific curves corresponding to said predetermined course; each said blade portion having, at opposite edges thereof, guide means received in said grooves.

15. In a differential as defined in claim 14, wherein each said housing include fluid intake and exhaust zones, said exhaust zone of said pump housing being joined to said intake zones of said two motor housings, said exhaust zones of said two motor housings being joined to said intake zone of said pump housing.

16. In a differential as defined in claim 15, further comprising a by-pass connecting said exhaust zone of said pump housing to said intake zone of said pump housing; pressure-reducing means received in said by-pass.

17. In a differential as defined in claim 15, comprising two energy-recuperating by-passes, each connecting said intake zone of said motor housing to said exhaust zone of said motor housing.

18. In a differential as defined in claim 17, further comprising a by-pass including a flow controlling device therein.

19. In a brake,
a stationary housing having an interior profile including a portion defining a monolobic configuration, a rotary cylindrical body mounted in said portion and having an axis of rotation arranged eccentrically therein, said body including a series of arc-shaped segments mounted in circular alignment in said housing and being equally spaced from one another to define therebetween a series of diametrically opposite slots, a symmetrical system of vanes received in said slots and bearing at each extremity against said interior profile, said vanes being longer than the diameter of said body and being shiftable in said slots during rotation of said body, each of said vanes including a pair of blades disposed at 180° with respect to each other and interconnected with ties, said ties being shaped to interfit each other to thereby prevent interfering with each other when said vanes slide in said slots, said housing including a fluid passageway outside said housing configuration, a fluid flow controlling means mounted in said passageway for gradually varying the flow of a fluid in said housing and thereby varying the rotation of said body, and counterweight means mounted at opposite ends of said rotary body associated with each blade of each individual vane and in line therewith for balancing the effects of the centrifugal and inertial forces acting on said vanes, and minimizing the vane pressure on said housing interior profiles.

20. In a brake as defined in claim 19, comprising means for guiding said vanes through a predetermined course.

21. In a brake as defined in claim 20, wherein said stationary housing includes two opposite end plates; a continuous groove being provided in each said end plate and defining a specific curve corresponding to said predetermined course; each said brake portion having, at opposite edges thereof, guide means received in said grooves.

* * * * *